(12) United States Patent
Wang et al.

(10) Patent No.: US 10,224,762 B2
(45) Date of Patent: Mar. 5, 2019

(54) LIVING-OBJECT PROTECTION SYSTEM ANTENNA STRUCTURE

(71) Applicant: QUALCOMM Incorporated, San Diego, CA (US)

(72) Inventors: Qi Wang, Ottobrunn (DE); Leandro Alberto Percebon, Munich (DE); Mohsen Farmahini Farahani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 15/663,670

(22) Filed: Jul. 28, 2017

(65) Prior Publication Data

US 2019/0036383 A1     Jan. 31, 2019

(51) Int. Cl.
*H02J 50/60*     (2016.01)
*H02J 7/00*      (2006.01)
*H02J 7/02*      (2016.01)
*B60L 11/18*     (2006.01)
*H04B 5/00*      (2006.01)
*H02J 50/12*     (2016.01)
*H01F 38/14*     (2006.01)

(52) U.S. Cl.
CPC .......... *H02J 50/60* (2016.02); *B60L 11/182* (2013.01); *H02J 7/0027* (2013.01); *H02J 7/025* (2013.01); *H04B 5/0037* (2013.01); *B60L 2210/30* (2013.01); *H01F 2038/146* (2013.01); *H02J 50/12* (2016.02)

(58) Field of Classification Search
CPC .......... H02J 50/60; H02J 7/025; H02J 7/0027; H02J 50/12; H04B 5/0037; B60L 11/182; B60L 2210/30; H01F 2038/146

USPC .......................................... 320/108
See application file for complete search history.

(56) References Cited

U.S. PATENT DOCUMENTS

| | | | | |
|---|---|---|---|---|
| 3,964,296 | A * | 6/1976 | Matzuk | A61B 8/00 73/607 |
| 5,421,376 | A | 6/1995 | Sinha | |
| 5,572,213 | A * | 11/1996 | Noneman | H04B 1/0007 342/13 |
| 6,492,957 | B2 * | 12/2002 | Carillo, Jr. | H01Q 1/245 250/336.1 |
| 8,059,051 | B2 | 11/2011 | Manasson et al. | |
| 8,913,971 | B2 * | 12/2014 | Arkiszewski | H03F 1/0227 455/127.1 |

(Continued)

*Primary Examiner* — M Baye Diao
(74) *Attorney, Agent, or Firm* — Hunter Clark PLLC

(57) ABSTRACT

Techniques for providing radio-frequency signals to a region of interest for a living-objection protection (LOP) system are provided. An example base wireless power transfer system includes a power-coupling element and a power transfer circuitry configured to provide energy to the power-coupling element to produce a magnetic field, and a living-object protection subsystem including an antenna configured to transmit a first radio-frequency (RF) signal with a main beam directed away from the power transfer circuitry and to receive a second RF signal, the antenna including a radiating element and a reflector with the reflector being disposed between the radiating element and the power transfer circuitry and comprising a metal sheet disposed over an area, the metal sheet defining at least one opening within the area and between the radiating element and the power transfer circuitry.

25 Claims, 9 Drawing Sheets

(56) References Cited

U.S. PATENT DOCUMENTS

| | | | |
|---|---|---|---|
| 8,970,317 B2 * | 3/2015 | Sarraf | H01Q 1/521 |
| | | | 333/135 |
| 9,098,824 B2 * | 8/2015 | Jones | G06Q 10/087 |
| 9,142,998 B2 | 9/2015 | Yu et al. | |
| 9,503,044 B2 * | 11/2016 | Granger-Jones | H01F 38/14 |
| 10,015,303 B2 * | 7/2018 | Kim | H04B 5/00 |
| 2015/0244445 A1 * | 8/2015 | Pang | H04B 7/0413 |
| | | | 455/41.1 |
| 2015/0260835 A1 | 9/2015 | Widmer et al. | |
| 2016/0178740 A1 | 6/2016 | Sieber et al. | |

* cited by examiner

LIVING-OBJECT PROTECTION SYSTEM ANTENNA STRUCTURE

TECHNICAL FIELD

The disclosure relates generally to living-object detection for wireless power delivery to electronic devices, and in particular to an antenna structure for a living-object protection system.

BACKGROUND

Remote systems, such as vehicles, have been introduced that include locomotion power derived from electricity received from an energy storage device such as a battery. Such energy storage devices need to be periodically charged. For example, hybrid electric vehicles include onboard chargers that use power from vehicle braking and traditional motors to charge the vehicles. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via an electromagnetic field) to be used to charge electric vehicles may overcome some of the deficiencies of wired charging solutions.

A Living-Object Protection (LOP) system may be included with a charging system to detect objects disposed within the expected wireless field. LOP systems generally utilize radio transmissions to detect moving objects to prevent charging power from being provided while a living object is in a region in which the living object may receive an unacceptably high amount of the charging power.

SUMMARY

The following detailed description and accompanying drawings provide a better understanding of the nature and advantages of the disclosure.

An example of a base wireless power transfer system according to the disclosure includes a power-coupling element, power transfer circuitry communicatively coupled to the power-coupling element and configured to provide energy to the power-coupling element to produce a magnetic field, and a living-object protection subsystem including an antenna configured to transmit a first radio-frequency (RF) signal with a main beam directed away from the power transfer circuitry and to receive a second RF signal, the antenna comprising a radiating element and a reflector with the reflector being disposed between the radiating element and the power transfer circuitry and comprising a metal sheet disposed over an area, the metal sheet defining at least one opening within the area and between the radiating element and the power transfer circuitry, and a processor communicatively coupled to the antenna and configured to analyze the second RF signal received by the antenna to determine whether an object is present in a region of interest proximate to the base wireless power transfer system.

Implementations of such a base wireless power transfer system may include one or more of the following features. The reflector may define a plurality of openings, within the area, that are each open to a respective edge of the area. At least one edge of the area may be continuous, having none of the plurality of openings being open to the at least one edge. The area may be rectangular such that the reflector has four edges, and such that every edge of the reflector has at least one opening of the plurality of openings open to the respective edge. The reflector may define a plurality of openings, within the area, without laterally enclosing, by metal, any of the plurality of openings. The reflector may include a plurality of sub-regions and a plurality of connection sections, each of the plurality of sub-regions spanning at least a sub-area, the plurality of sub-regions being connected by the plurality of connection sections, such that each of the plurality of connection sections is narrower than the each of the plurality of sub-regions. The plurality of sub-regions and the plurality of connection sections may form no loops. The sub-regions may be similarly shaped. The plurality of sub-regions may be disposed in a grid. The antenna may include discrete radiating elements for transmitting the first RF signal and for receiving the second RF signal. A housing containing the power-coupling element, the power transfer circuitry, and the living-object protection subsystem, the power-coupling element being a coil centered about an axis, and the antenna being disposed to transmit the main beam of the first RF signal away from the axis and toward the region of interest. The at least one opening may extend to an edge of the area.

An example of a base wireless power transfer system according to the disclosure includes coupling means for producing a magnetic field, power transfer means, communicatively coupled to the coupling means, for providing energy to the coupling means to produce the magnetic field, and living-object protection means comprising radio-frequency (RF) means for transmitting a first RF signal with a main beam directed away from the power transfer means and for receiving a second RF signal, the RF means including radiating means and reflecting means with the reflecting means being disposed between the radiating means and the power transfer means and comprising a metal sheet disposed over an area, the metal sheet defining at least one opening within the area, at least part of the at least one opening being between the radiating means and the power transfer means, and the at least one opening extending to an edge of the area, and analyzing means communicatively coupled to the RF means for analyzing the second RF signal to determine whether an object is present in a region of interest proximate to the base wireless power transfer system.

Implementations of such a base wireless power transfer system may include one or more of the following features. The reflecting means may define a plurality of openings, within the area, that are each open to a respective edge of the area. At least one edge of the area may be continuous, having none of the plurality of openings being open to the at least one edge. The area may be rectangular such that the reflecting means have four edges, and such that every edge of the reflecting means has at least one opening of the plurality of openings open to the respective edge. The reflecting means may define a plurality of openings, within the area, without laterally enclosing, by metal, any of the plurality of openings. The reflecting means may include a plurality of sub-regions and a plurality of connection sections, each of the plurality of sub-regions spanning at least a sub-area, the plurality of sub-regions being connected by the plurality of connection sections, such that each of the plurality of connection sections is narrower than the each of the plurality of sub-regions. The plurality of sub-regions and the plurality of connection sections may form no loops. The sub-regions may be similarly shaped. The plurality of sub-regions may be disposed in a grid. The RF means may include discrete radiating elements for transmitting the first RF signal and for receiving the second RF signal. The system may further include a housing means for containing the coupling means, the power transfer means, and the living-object protection means, the coupling means comprising a coil centered about an axis, and the RF means being disposed to transmit the main beam of the first RF signal away from the axis and toward the region of interest.

Figure 1:
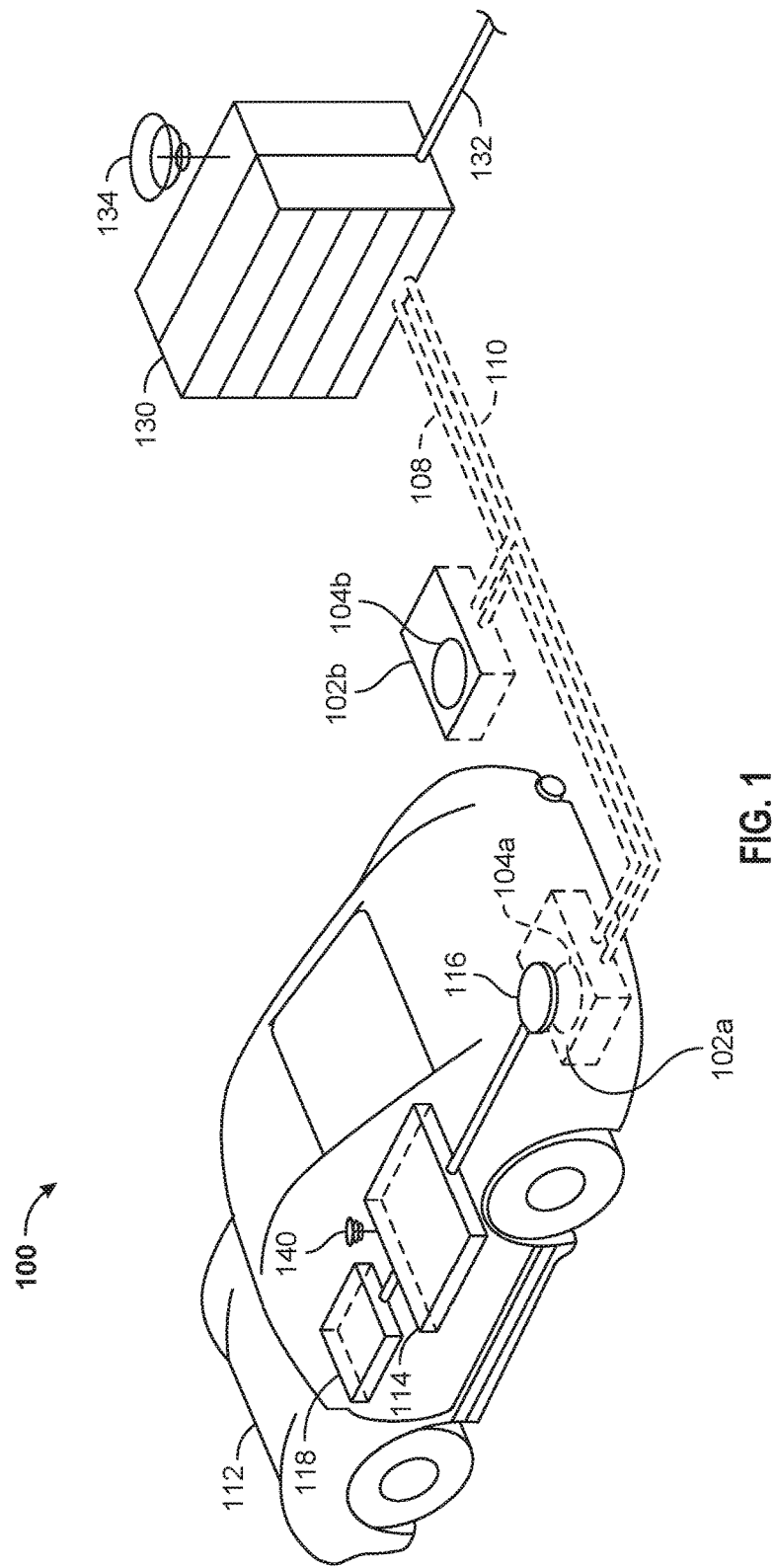
FIG. 1 is a perspective view of an example wireless electric vehicle charging system.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is a description of example implementations and does not represent the only implementations in which the invention may be practiced. The term "exemplary" used throughout this description means "serving as an example, instance, or illustration," and does not require that the item(s) described as exemplary is(are) preferred or advantageous over other implementations. The detailed description includes specific details for the purpose of providing a thorough understanding of the implementations. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into an electro-magnetic field (e.g., a magnetic field) may be received, captured by, or coupled by a "receiving element" to achieve power transfer.

Techniques are discussed herein for providing radio-frequency signals to a region of interest for a living-objection protection (LOP) system. An antenna for an LOP is provided that has a reflector and a radiator that includes one or more radiating elements. The antenna is disposed in a base wireless power transfer system of a wireless electric vehicle charging (WEVC) system such that the radiator is disposed to radiate Radio Frequency signals into a region of interest where a living object would be in potential danger if wireless charging power is provided by the base wireless power transfer system. The reflector is disposed between the radiator and power transfer circuitry of the base wireless power transfer system for providing the charging power in order to direct radiated Radio Frequency power from the radiator to the region of interest and to reduce Radio Frequency radiation from the radiator from reaching the power transfer circuitry. The reflector is configured to reflect Radio Frequency radiation while inhibiting the production of eddy current in the reflector to inhibit heating of the reflector and to inhibit loss of the charging power. To inhibit eddy current production, the reflector may have only small areas of contiguous metal such that very little eddy current loops may form in the metal. The reflector may have gaps or openings between regions of metal, and the metal may form few or even no loops of metal enclosing a region that is devoid of metal such that few or no large loops of current may be formed.

Items and/or techniques described herein may provide one or more of the following capabilities, as well as other capabilities not mentioned. Loss of charging power may be inhibited while increasing Radio Frequency waves radiated into a region of interest for living-object detection. A living-object detection signal radiated into a base pad of a wireless charging system, e.g., into power transfer circuitry of a base wireless power transfer system, may be inhibited. Living-object detection signal reflection performance similar to a solid reflector may be provided by a non-solid reflector while reducing eddy currents, induced by charging power, and/or reducing reflector heating, induced by charging power, compared to the solid reflector. Living-object detection radiation provided to a region of interest may be improved while reducing charging energy absorption by a substrate material near a base wireless power transfer system. Other capabilities may be provided and not every implementation according to the disclosure must provide any, let alone all, of the capabilities discussed.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include, besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like) and possible, whether presently known or not.

FIG. 1 is a diagram of a wireless charging system 100 for charging an electric vehicle 112, in accordance with some implementations. The wireless charging system 100 enables charging of an electric vehicle 112 while the electric vehicle 112 is parked near a base wireless charging system 102a. Spaces for two electric vehicles are illustrated in a parking area to be parked over corresponding base wireless charging systems 102a and 102b. In some implementations, a local power distribution center 130 may be connected to a power backbone 132 and configured to provide an alternating current (AC) or a direct current (DC) supply through a power link 110 to the base wireless charging systems 102a and 102b. The base wireless charging system 102a includes a base power transfer element 104a for wirelessly transferring (e.g., transmitting and/or receiving) power. Likewise, the base wireless charging system 102b includes a base power transfer element 104b for wirelessly transferring power. In some implementations (not shown in FIG. 1), the base power transfer elements 104a or 104b may be stand-alone physical units that are not part of the base wireless charging systems 102a or 102b. The electric vehicle 112 may include a battery unit 118, and an electric vehicle wireless charging system 114 including an electric vehicle power transfer element 116. In some implementations (not shown in FIG. 1), the vehicle power transfer element 116 may be part of the electric vehicle wireless charging system 114. In some implementations, the entity comprising the base power transfer element 104a is referred to as the base pad and the entity comprising the vehicle power transfer element 116 is referred to as the vehicle pad.

The electric vehicle power transfer element 116 may interact with the base power transfer element 104a for example, via a region of a wireless field generated by the base power transfer element 104a. In some implementations, the electric vehicle power transfer element 116 may receive power when the electric vehicle power transfer element 116 is located in an energy field produced by the base power transfer element 104a. The field corresponds to a region where energy output by the base power transfer element 104a may be captured by the electric vehicle power transfer element 116. For example, the energy output by the base power transfer element 104a may be at a level sufficient to charge or power the electric vehicle 112.

In some implementations, the field may correspond to the "near field" of the base power transfer element 104a. The near field may correspond to a region in which there are strong reactive fields resulting from the currents and charges in the base power transfer element 104a that do not radiate power away from the base power transfer element 104a. In some implementations, the near field may correspond to a region that is within about ½π of a wavelength of the base power transfer element 104a (and vice versa for the electric vehicle power transfer element 116).

The local power distribution center 130 may be configured to communicate with external entities (e.g., a power grid management system) via a communication backhaul 134, and with the base wireless charging system 102a via a communication link 108 (e.g., wired or wireless). For example, the communication backhaul 134 may communicate with an antenna 140 of the vehicle 112 regarding the charging infrastructure of the system 100.

In some implementations, the electric vehicle power transfer element 116 may be aligned with the base power transfer element 104a and, therefore, disposed within a near-field region simply by the driver positioning the electric vehicle 112 correctly relative to the base power transfer element 104a. In other implementations, the driver may be given visual, auditory, or tactile feedback, or combinations thereof, to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minor driver intervention provided that the electric vehicle 112 is equipped with appropriate equipment such as a servo steering wheel, ultrasonic sensors, and intelligence to adjust the electric vehicle 112. In still other implementations, the electric vehicle power transfer element 116, the base power transfer element 104a, or a combination thereof, may have functionality for displacing and moving the power transfer elements 116 and 104a relative to each other to more accurately position them and develop more efficient coupling there between.

The base wireless charging system 102a may be located in a variety of locations. As non-limiting examples, some suitable locations include a parking area at a home of an owner of the electric vehicle 112, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may be no exposed electrical contacts and no or little mechanical wear out, thereby improving reliability of the wireless charging system 100. Manipulations with cables and connectors may not be needed, and there may be no cables, plugs, or sockets that may be exposed to moisture and water in an outdoor environment, thereby improving safety. There may be no sockets, cables, and plugs visible or accessible, thereby reducing potential vandalism of power charging devices. Further, since the electric vehicle 112 may be used as a distributed storage device to stabilize a power grid, a convenient docking-to-grid solution may help to increase availability of vehicles for Vehicle-to-Grid (V2G) operation. The wireless charging system 100 as described with reference to FIG. 1 may provide aesthetic and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power from the power distribution grid to the electric vehicle 112 via the electric vehicle charging system 114 and the electric vehicle charging system 114 transfers power from the electric vehicle 112 via the base wireless charging system 102a to the grid, e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
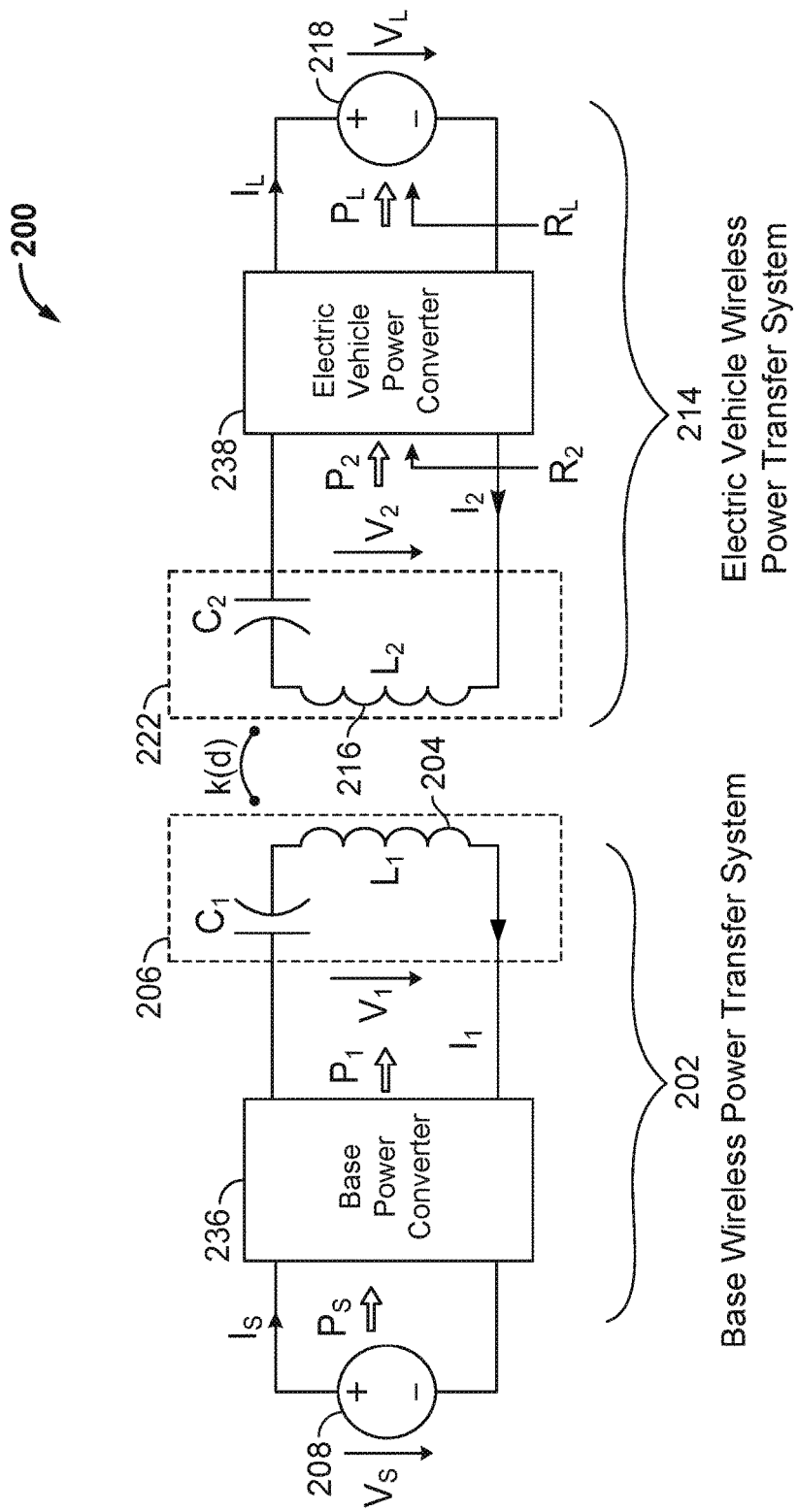
FIG. 2 is a schematic diagram of example components of a primary side and a secondary side of the wireless electric vehicle charging system shown in FIG. 1.

FIG. 2 is a schematic diagram of exemplary components of a wireless power transfer system 200 that may be used for inductive power transfer. As shown in FIG. 2, the wireless power transfer system 200 may be comprised of a base wireless power transfer system 202 and an electric vehicle wireless power transfer system 214. The base wireless power transfer system 202 may include a base transmit circuit 206 including a base power transfer element 204 having an inductance $L_1$. Analogously, as shown in FIG. 2, the electric vehicle wireless power transfer system 214 may include an electric vehicle receive circuit 222 including an electric vehicle power transfer element 216 having an inductance $L_2$.

Implementations of the base transmit circuit 206 and the electric vehicle receive circuit 222 described herein may use capacitively-loaded wire loops (i.e., multi-turn coils) forming a resonant circuit that is capable of efficiently coupling energy from a primary element (transmitter) to a secondary element (receiver) via a magnetic or electromagnetic near field if both primary and secondary elements are tuned to substantially a common resonant frequency (substantially the same resonant frequency). Using resonant circuits or structures for coupling energy may be referred to "magnetic coupled resonance," "electromagnetic coupled resonance," and/or "resonant induction." The operation of the wireless power transfer system 200 will be described based on power transfer from the power distribution grid via the base wireless power transfer system 202 and the electric vehicle wireless power transfer system 214 to an electric vehicle 112, but is not limited thereto. For example, as discussed above, the electric vehicle 112 may transfer power in the reverse direction via the electric vehicle wireless power transfer system 214 and the base wireless power transfer system 202 to the power distribution grid.

With reference to FIG. 2, a power supply 208 (e.g., AC or DC) supplies power $P_S$ to the base wireless power transfer system 202 to transfer energy to the electric vehicle 112 via the electric vehicle power transfer system 214. The base wireless power transfer system 202 includes a base power converter 236. The base power converter 236 may include circuitry such as an AC/DC converter configured to convert power from standard mains AC to DC power at a suitable voltage level, and a DC/AC converter configured to convert DC power to power at an operating frequency suitable for wireless high-power transfer. The power converter 236 supplies power $P_1$ to the base transmit circuit 206 including the base power transfer element 204 to emit a field at a desired frequency. The base transmit circuit 206 may include a capacitor $C_1$ coupled in series to a coil of the base power transfer element 204 as shown in FIG. 2 by example. Alternatively, the base transmit circuit 206 may be formed with the capacitor $C_1$ coupled in parallel to the coil, or may be formed of several reactive elements in any combination of parallel or series topology. The capacitor $C_1$ or the reactive elements may be provided to form a resonant circuit with the base power transfer element 204 near or at the operating frequency defined by the base wireless power transfer system 202. The base power transfer element 204 receives the power $P_1$ and wirelessly transmits power at a level sufficient to charge or power the electric vehicle 112. For example, the power level provided wirelessly by the base power transfer element 204 may be on the order of kilowatts (kW) (e.g., anywhere from 1 kW or lower to 110 kW or higher).

The electric vehicle power transfer element 216 may be positioned within the near field of a primary electromagnetic field transmitted by the base power transfer element 204. In this case, the base power transfer element 204 and the electric vehicle power transfer element 116 may become coupled to one another such that power may be transferred to the electric vehicle receive circuit 222. Element k(d) represents the coupling coefficient resulting at coil separation d. The electric vehicle receive circuit 222 may include a capacitor $C_2$ coupled in series with a coil of the electric vehicle power transfer element 216 as shown in FIG. 2 by example. Alternatively, the electric vehicle receive circuit 222 may be formed with the capacitor $C_2$ coupled in parallel with the coil, or may be formed of several reactive elements in any combination of parallel or series topology. The capacitor $C_2$ or the reactive elements may be provided to form a resonant circuit with the electric vehicle power transfer element 216 near or at the operating frequency as defined by the electric vehicle wireless power transfer system 214. Due to the resonance of the electric vehicle receive circuit 222, the electric vehicle power transfer element 116 may generate a secondary electromagnetic field. The electric vehicle receive circuit 222 receives power $P_2$ and provides the power $P_2$ to an electric vehicle power converter 238 of the electric vehicle wireless power transfer system 214.

As just described, the resonant frequency may be based on the inductance and capacitance. As shown in FIG. 2, inductance may generally be the inductance of the power transfer element (e.g., a coil), whereas, capacitance may be added to the power transfer element to create a resonant structure at a desired resonant frequency.

The electric vehicle power converter 238 may include, among other things, an AC/DC converter configured to convert power at an operating frequency back to DC power at a voltage level matched to the voltage level of an electric vehicle load 218 (e.g. a battery or battery pack). The electric vehicle power converter 238 may provide a converted power $P_L$ to charge the electric vehicle load 218.

The power supply 208, the base power converter 236, and the base power transfer element 204 may be stationary and located at a variety of locations as discussed above. The electric vehicle power converter 238, and the electric vehicle power transfer element 216 may be onboard the electric vehicle 112. In some implementations, both the electric vehicle power converter 238 and the electric vehicle power transfer element 216 are integrated in the electric vehicle load 118 (e.g., in a battery pack). The electric vehicle wireless power transfer system 214 may be configured to provide power wirelessly through the electric vehicle power transfer element 216 and the base power transfer element 204 to the base wireless power transfer system 202 to feed power back to the grid. In some implementations, each of the electric vehicle power transfer element 216 and the base power transfer element 204 may act as a transmit or a receive element based on the mode of operation.

While not shown in FIG. 2, the wireless power transfer system 200 may include a vehicle-side load disconnect unit (LDU) to safely disconnect the electric vehicle load 218 from the wireless power transfer system 200. In some implementations supporting reverse mode operation, an LDU may be provided on the base side (not shown) to safely disconnect the power supply 208 (acting as a load) from the wireless power transfer system 200. For example, in case of an emergency or system failure, the LDU may be triggered to disconnect the load from the wireless power transfer system 200. The LDU may be provided in addition to a battery management system (not shown) for managing charging to a battery, or it may be part of the battery management system.

Further, the electric vehicle wireless power transfer system 214 may include switching circuitry (not shown) for selectively connecting and disconnecting the electric vehicle power transfer element 216 to and from the electric vehicle power converter 238. Disconnecting the electric vehicle power transfer element 216 may suspend charging and may change the "load" as "seen" by the base wireless power transfer system 202 (acting as a power transmitter), which may be used to "cloak" the electric vehicle wireless power transfer system 214 (acting as the receiver) from the base wireless power transfer system 202. The load changes may be detected if the base wireless power transfer system 202 includes a load sensing circuit (not shown). Accordingly, the electric vehicle wireless power transfer system 214 (acting as a power transmitter) may include a mechanism for determining when the base power transfer element 204 connected to the base wireless power transfer system 202 (acting as a power receiver) is present in the near field of the electric vehicle power transfer element 216.

As described above, in operation, assuming energy transfer towards the vehicle 112 (battery 118), input power is provided from the power supply 208 such that the base power transfer element 204 generates an electromagnetic field for providing the energy transfer. The electromagnetic field in turn may induce power into the electric vehicle power transfer element 216 that is sufficient for storage or consumption by the electric vehicle 112. As described above, in some implementations, the base transmit circuit 206 and the electric vehicle receive circuit 222 are configured according to a mutual resonant relationship. In some implementations, the resonant frequencies of the base transmit circuit 206 and the electric vehicle receive circuit 222 are very close or substantially the same. Transmission losses between the input of the base wireless power transfer system 202 and the output of the electric vehicle power transfer system 214 may be reduced when the electric vehicle power transfer element 216 is located in the near field of the base power transfer element 204.

While not shown, the base wireless power transfer system 202 and the electric vehicle wireless power transfer system 214 may both include an oscillator, a driver circuit such as a power amplifier, a filter, and a matching circuit for efficient power transfer via the power transfer elements. The oscillator may be configured to generate a desired operating frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance as "seen" at the base power transfer element 204 to the base power converter 236. In some implementations, the base power converter 236 may include solid state switching circuitry to generate a suitable power output as needed to charge an electric vehicle battery (e.g., the battery 118). Analogously, filter and matching circuits may be used to match the impedance as "seen" at the electric vehicle power transfer element 216 to the electric vehicle power converter 238. In some implementations, the electric vehicle power converter 238 may include a rectifier and switching circuitry to generate a suitable DC power output to charge the battery.

The electric vehicle power transfer element 216 and the base power transfer element 204 as described throughout the disclosed implementations may be referred to or configured as "loop" antennas, and more specifically, multi-turn loop antennas. The elements 204 and 216 may also be referred to herein or be configured as "magnetic" antennas. The term "power transfer element" refers to a component that may wirelessly output energy or wirelessly receive energy for coupling to another "power transfer element." The power transfer element may also be referred to as an "antenna" or a "coupler" of a type that is configured to wirelessly output or receive power. As used herein, the power transfer elements 204 and 216 are examples of "power transfer elements" of a type that are configured to wirelessly output, wirelessly receive, and/or wirelessly relay power. Loop (e.g., multi-turn loop) antennas may be configured to include an air core or a physical core such as a ferrite core. An air-core loop antenna may allow the placement of other components within the core area. Physical core antennas including ferromagnetic or ferrimagnetic materials may allow development of a stronger electromagnetic field and improved coupling.

Each of the base power transfer element 204 and the electric vehicle power transfer element 216 may be a "circular"-type coil (using a "circular" coil), a "Double D"-type coil (using a double coil arrangement), a "Solenoid"-type coil (using a solenoid coil wound around a core), a "Bipolar"-type coil (using a double coil arrangement with virtually zero coupling between the coils) or any other type of coil structure based on a single or multi-coil arrangement. In some implementations of the wireless power transfer system 200, different power transfer element types may be used for the base power transfer element 204 and the electric vehicle power transfer element 216.

Figure 3:
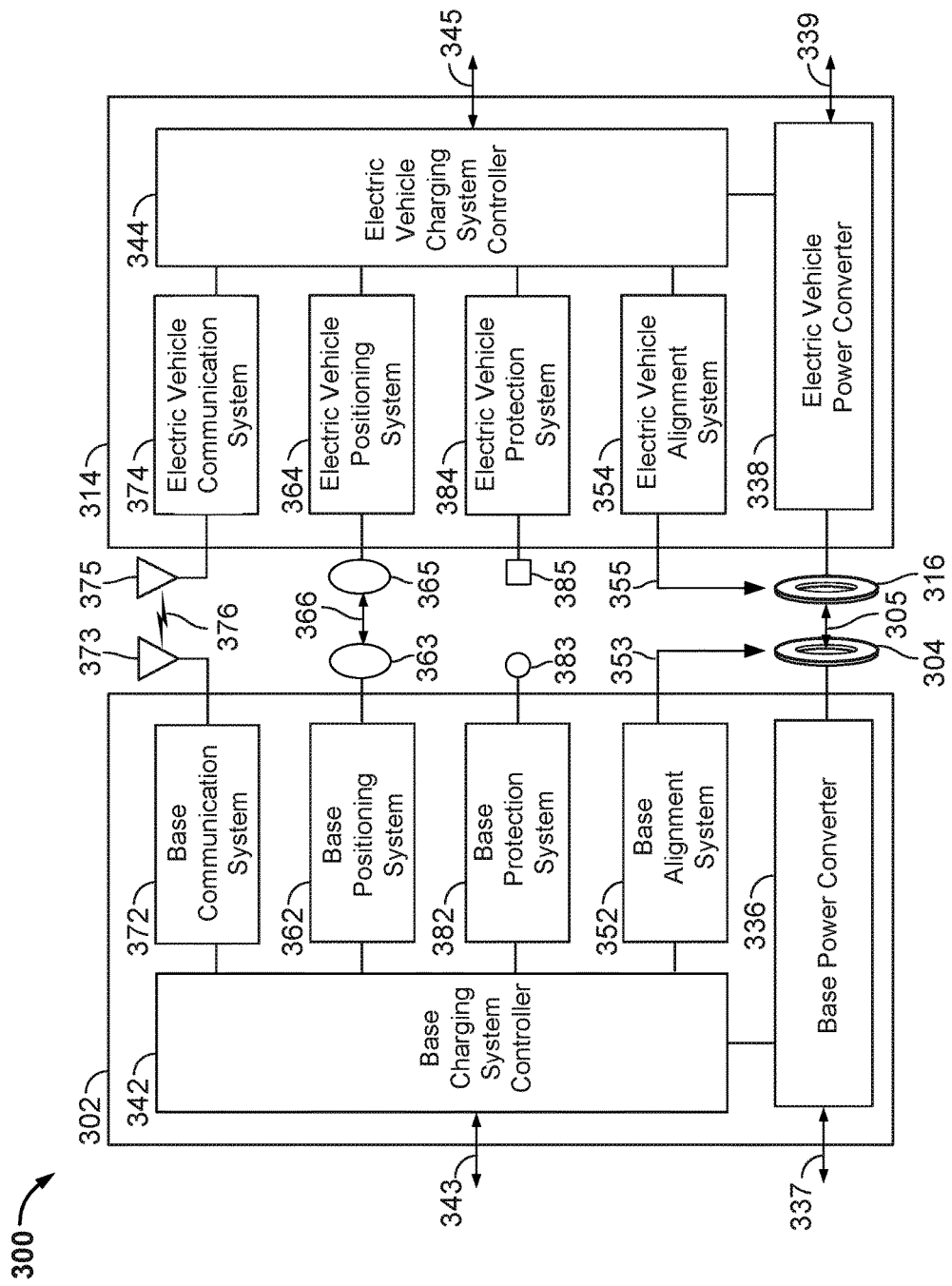
FIG. 3 is a functional block diagram of the primary side and the secondary side of the wireless electric vehicle charging system shown in FIG. 1.

FIG. 3 is another block diagram showing further exemplary components of a wireless charging system 300, e.g., of the wireless charging system 100 of FIG. 1, and/or of which the wireless power transfer system 200 of FIG. 2 may be part. The wireless charging system 300 may be split into a base charging system 302 and an electric vehicle charging system 314. One or more additional components may be included and/or one or more described components may not be included in the base charging system 302 and/or the electric vehicle charging system 314. The base charging system 302 may include a base power converter 336 (e.g., the base power converter 236 of FIG. 2) operationally connected to a base power transfer element 304 (e.g., the base power transfer element 204 of FIG. 2). Further, the base charging system 302 may include a base charging system controller 342 operationally connected to the base power converter 336 and to various ancillary systems such as a base communication system 372 operationally connected to a base communication antenna 373, a base positioning system 362 operationally connected to base positioning antennas 363, a base protection system 382 operationally connected to base protection sensors 383, and a base alignment system 352 operationally connected to a base alignment mechanism 353. One or more of the base alignment system 352, the base protection system 382, the base positioning system 362, and the base communication system 372 may be optional or may use one or more components of one or more of the systems 352, 362, 372, 382 (e.g., the base communication system 372 may provide communication via the base power transfer element 304 through modulation of the magnetic field used for power transfer).

Analogously, the electric vehicle charging system 314 may include an electric vehicle power converter 338 (e.g., the electric vehicle power converter 238 of FIG. 2) operationally connected to an electric vehicle power transfer element 316 (e.g., the electric vehicle element 216 of FIG. 2). Further, the electric vehicle charging system 314 may include an electric vehicle charging system controller 344 operationally connected to the electric vehicle power converter 338 and to various ancillary systems such as an electric vehicle communications system 374 operationally connected to an electric vehicle communication antenna 375, an electric vehicle positioning system 362 operationally connected to electric vehicle positioning antennas 365, an electric vehicle protection system 384 operationally connected to electric vehicle protection sensors 385, and an electric vehicle alignment system 354 operationally connected to an electric vehicle alignment mechanism 355. One or more of the electric vehicle alignment system 354, the electric vehicle protection system 384, the electric vehicle positioning system 364, and the electric vehicle communication system 374 may be optional or may use one or more components of one or more of the systems 354, 364, 374, 384 (e.g., the electric vehicle communication system 374 may receive communications via the electric vehicle power transfer element 304 through detection of modulation of the magnetic field used for power transfer). Any of the systems shown may be provided on one side but not the other (e.g., the electric vehicle protection system 384 may be absent while the base protection system 382 may be present and vice versa).

FIG. 3 also illustrates a wireless power link 305, a communication link 376, and a positioning link 366. Furthermore, FIG. 3 illustrates a base charging system power interface 337 and an electric vehicle charging system power interface 339 as well as a base charging system communication interface 343 and an electric vehicle charging system communication interface 345.

As described above with reference to FIG. 2, and assuming energy flow towards the electric vehicle 112, in FIG. 3 the base charging system power interface 337 may be configured to provide power to the base power converter 336 from a power source, such as an AC or DC power supply, e.g. the local power distribution center 130 as shown in FIG. 1. The base power converter 336 may receive AC or DC power via the base charging system power interface 337 to excite the base power transfer element 304. The electric vehicle power transfer element 316, when in the near-field coupling-mode region, may receive energy in the form of an oscillating signal. The electric vehicle power converter 338 converts the oscillating signal from the electric vehicle power transfer element 316 to a power signal suitable for charging the battery 118 via the electric vehicle charging system power interface 339.

In some implementations, the base wireless charging system 302 and all its subsystems and modules are centrally controlled by the base charging system controller 342 that handles and relays control and status information exchanged between the different subsystems. The base charging system controller 342 may include the base charging system communication interface 343 for communication with other systems (not shown) such as, for example, a computer, and a control center, or a smart power grid communications network. Analogously, the electric vehicle wireless charging system 314 may be centrally controlled by the electric vehicle charging system controller 344 that may include the electric vehicle charging system communication interface 345 for communication with other systems (not shown) such as, for example, a computer on board the vehicle 112, a battery management system that manages charge and discharge of the battery 118, other electronic systems within the vehicle 112, and remote electronic systems. The electric vehicle charging system controller 344 may communicate via the electric vehicle charging system communication interface 345 with a park assistance system by providing position data determined in the electric vehicle positioning system 364 and/or the base positioning system 362. In some implementations, the electric vehicle charging system controller 344 may communicate with a semi-automatic parking system configured to perform an automatic braking when the vehicle 112 has reached the final position for charging. In other implementations, the electric vehicle charging system controller 344 may communicate with an autonomous driving system configured to perform a largely automated parking that may provide higher parking accuracy, thus reducing or eliminating the need for mechanical alignment in any of the base wireless charging system 302 and the electric vehicle wireless charging system 314. Further, the electric vehicle charging system controller 344 may be configured to communicate with other electric vehicle onboard electronics. For example, electric vehicle charging system controller 344 may be configured to communicate with visual output devices (e.g., a dashboard display), acoustic/audio output devices (e.g., a buzzer, speakers) e.g., for purposes of guidance and alignment. The electric vehicle charging system controller 344 may be configured to receive commands from mechanical input devices (e.g., a keyboard, a touch screen, and pointing devices such as a joystick, a trackball, etc.), and from audio input devices (e.g., microphones of an electronic voice recognition system).

The base communication system 372 and the electric vehicle communication system 374 may include subsystems or circuits for specific application with separate communication channels. These communications channels may be separate physical channels or separate logical channels. In some implementations, communications are performed over the communication link 376 at radio frequencies using a radio-frequency (RF) communications standard such as Bluetooth®, Zigbee®, Dedicated Short Range Communications (DSRC), WLAN, etc. operating in an unlicensed band. In some other implementations, a cellular radio network is used. As non-limiting examples, the base alignment system 352 may communicate with the electric vehicle alignment system 354 through the communication link 376 to provide a feedback mechanism for more closely aligning the base power transfer element 304 with the electric vehicle power transfer element 316 via mechanical (kinematic) alignment. Similarly, the base positioning system 362 may communicate with the electric vehicle positioning system 364 through the communication link 376 to provide a feedback mechanism to guide an operator to a charging spot and to align the base power transfer element 304 with the electric vehicle power transfer element 316. In addition, there may be separate general-purpose communication links (e.g., channels) supported by the base communication system 372 and the electric vehicle communication system 374 for communicating other information between the base wireless charging system 302 and the electric vehicle wireless charging system 314 e.g., using an Ethernet over radio protocol. This information may include information about electric vehicle characteristics, battery characteristics and charging status, power capabilities and other characteristics of both the base wireless charging system 302 and the electric vehicle wireless charging system 314, as well as maintenance and diagnostic data for the electric vehicle 112. Some implementations may provide sufficient bandwidth for the allocation of value-add services to the vehicle user/owner.

In some implementations, the base positioning system 362 and/or the electric vehicle positioning system 364 are configured to determine the position of the electric vehicle 112 with respect to the charging spot by transmitting suitable signals via the positioning link 366. The positioning link 366 may be bi-directional, meaning that positioning signals may be emitted by the base positioning system 362 or the electric vehicle positioning system 364 or by both.

In some implementations relying on mechanical (kinematic) alignment by physically (mechanically) moving the base power transfer element 304 and/or the electric vehicle power transfer element 316, the base alignment system 352 and/or the electric vehicle alignment system controls the alignment of the base power transfer element 304 and/or the electric vehicle power transfer element 316 via the alignment mechanism 353 and/or the alignment mechanism 355, respectively. In some implementations, information on an alignment offset between the base power transfer element 304 and the electric vehicle power transfer element 316 is provided to the base alignment system 352 and/or to the electric vehicle alignment system 354 by the base positioning system 362 and/or the electric vehicle positioning system 364. In other implementations, information on an alignment offset is determined by the base alignment system 352 and/or by the electric vehicle alignment system 354.

Furthermore, the wireless charging system 300 may include detection and/or sensor systems to protect the wireless charging system 300. For example, the wireless charging system 300 may include the base protection system 382 and the electric vehicle protection system 384. These protection systems 382 and 384 may be configured to detect foreign objects in the space near and/or between the base power transfer element 304 and/or the electric vehicle power transfer element 316. As non-limiting examples, this may include detection of foreign (e.g., metallic) objects that may be heated up (e.g., through induction heating and/or hysteresis losses) (e.g., to critical temperatures) during the wireless charging operation, detection of hazardous events such as may be produced by metallic objects in connection with incandescent materials, and/or temperature monitoring of the base power transfer element 304 and/or the electric vehicle power transfer element 316 and/or of any other part of the wireless charging system 300 and the electric vehicle 112. Further, the protection systems 382 and 384 may be configured to detect living objects approaching the power transfer elements 304 and 316 beyond a radius. In some implementations, the protection systems 382 and 384 may be configured to detect objects based on mechanical alignment of the power transfer elements 304 and/or 316 e.g., mechanical alignment may be sensed as differing from an expected height and/or position based on a foreign object obstructing movement of a power transfer element.

The wireless charging system 300 may support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle wireless charging system 314, the wireless charging system 300 may use in-band signaling and/or out-of-band signaling. Out-of-band signaling may be performed via the communications link 376 e.g., using a RF technology as previously described. For in-band signaling, a low-depth amplitude or phase modulation of the wireless power carrier signal that may be transmitted on the wireless power link 305 may be used.

To enable wireless high power transfer, some implementations may be configured to transfer power at a frequency, as one example, in the range from 20-150 kHz. This low operating frequency may allow higher efficiency power conversion that may be achieved using solid state devices. In addition, there may be less coexistence issues with radio systems compared to other bands. However, other frequencies of operation in other ranges may also be used (e.g., frequencies in the 6.78 MHz or 13.56 MHz ISM bands).

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The wireless charging system 300 may be configured to determine values of components and/or characteristics of the wireless charging system 300. For example, the system 300 may be configured to determine parasitic values of components and/or or values of components that are affected by interaction with other components, such as inductances that are affected by proximity to other components of the system 300. The values of the determined components may be used to adjust power transfer characteristics, e.g., frequency of a magnetic field used to transfer power wirelessly.

Figure 4:
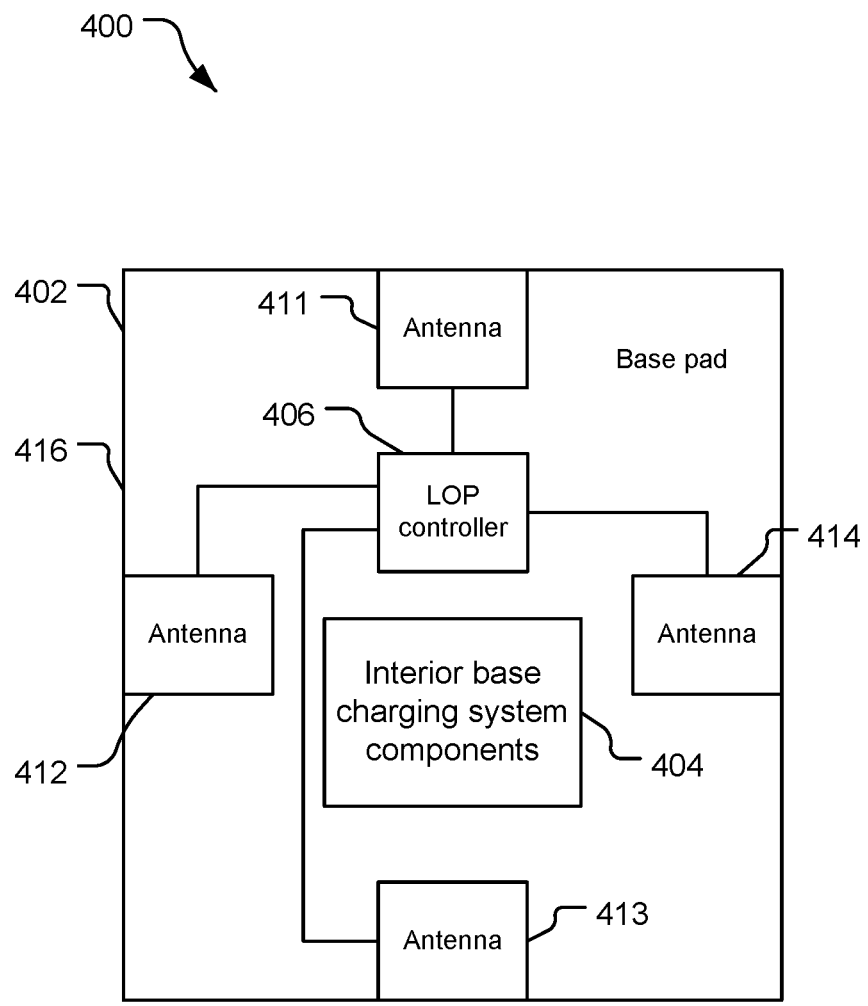
FIG. 4 is a block diagram of a base charging system including living-object protection.

Referring to FIG. 4, with further reference to FIGS. 1-3, an electric vehicle charging system 400 includes a base pad 402, interior base charging system components 404, a living-object-protection (LOP) controller 406, and antennas 411, 412, 413, 414. FIG. 4 shows only a portion of the components of the system 300 shown in FIG. 3, while also showing some components not shown in FIG. 3. The system 400 is configured to provide charging power for wirelessly charging a device such as the electric vehicle 112 and to protect living objects from being radiated by the charging power. The LOP controller 406 combined with the antennas 411-414 (and other appropriate components not shown) form an LOP subsystem or an LOP means. The LOP means may include RF means for transmitting and receiving RF signals, with the RF means including, for example, the antennas 411-414. The LOP means may include analyzing means for analyzing received RF signals to determine whether an object is in a region proximate to the WEVC system, e.g., in a region where the object may receive an undesirably-high amount of energy from the charging energy were the charging energy to be provided while the object is in its present location.

The interior base charging system components 404 include the components for providing charging power to the electric vehicle 112. The components 404 provide power transfer means for providing energy to the base power transfer element 304 to produce a magnetic field. The components 404 may include the entire base charging system 302, including power transfer circuitry including the base power converter 336 and the base power transfer element 304. The base power transfer element 304 serves as a power-coupling element configured to produce a magnetic field for transferring power to the electric vehicle 112 and to couple to a magnetic field. The base power transfer element provides coupling means for producing a magnetic field and for coupling to a magnetic field if desired. While the elements shown in FIG. 4 do not necessarily represent an exact physical layout of the system 400, in this example at least some of the interior base charging system components 404 are disposed in the interior of the base pad 402. In particular, the components 404 are disposed inward of the antennas 411-414 relative to a housing 416 of the base pad 402. The housing 416 may provide a housing means for containing components discussed herein including coupling means, power transfer means, and LOP means.

The LOP controller 406 may include appropriate hardware and, optionally, software to perform functions discussed herein. The LOP controller 406 preferably includes a processor that is an intelligent hardware device, for example a central processing unit (CPU) such as those made or designed by QUALCOMM®, ARM®, Intel® Corporation, or AMD®, a microcontroller, an application specific integrated circuit (ASIC), etc. The processor may comprise multiple separate physical entities that can be distributed in the base pad 402. The controller 406 may include a memory that may include random access memory (RAM) and/or read-only memory (ROM). The memory in the LOP controller 406 is a non-transitory, processor-readable storage medium that stores software which is processor-readable, processor-executable software code containing instructions that are configured to, when performed, cause the processor to perform various functions described herein. The description may refer only to the controller 406 performing functions, and this includes the processor of the LOP controller 406 performing the functions. The description may refer to only the processor performing functions, but this includes other implementations such as where the processor executes software and/or firmware. The software may not be directly executable by the processor and instead may be configured to, for example when compiled and executed, cause the processor to perform the functions. Whether needing compiling or not, the software contains the instructions to cause the processor to perform the functions.

The LOP controller 406 is configured to work in conjunction with the antennas 411-414 to help prevent living objects from being radiated by the charging power provided by the interior base charging system components 404. The LOP controller 406 is configured to cause the antennas 411-414 to transmit radio-frequency (RF) signals. The LOP controller 406 is configured to analyze RF signals received by the antennas 411-414, e.g., the transmitted RF signals that have reflected off one or more objects, to determine whether a living object will be radiating by the charging power if the charging power were to be provided by the system 400.

Figure 5:
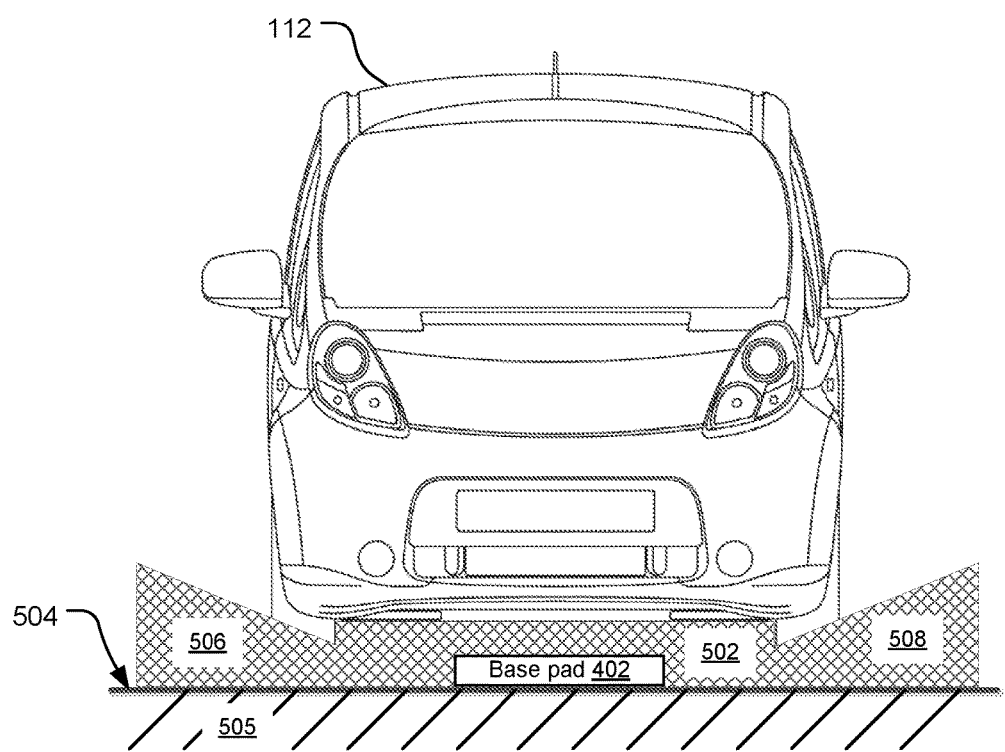
FIG. 5 is a front view of an electric vehicle disposed over a base pad.

Referring also to FIG. 5, the antennas 411-414 are configured and disposed to provide RF signals to a region of interest 502. The region of interest 502 is a volume where a living object might receive an undesirably-high amount of the charging power if the charging power is provided by the components 404. The region of interest 502 is above and outboard of the base pad 402 because the base pad 402 is typically disposed below the electric vehicle 112 either on (as shown in FIG. 5) or below a surface 504 of a substrate 505 (e.g., the ground, pavement, driveway, parking garage, etc) supporting the base pad 402. The region of interest 502 as shown in FIG. 5 extends to the sides of the electric vehicle 112, and side portions 506, 508 of the region of interest 502 may be covered by the antennas 412, 414. That is, radiation may be transmitted by the antennas 412, 414 into the side portions 506, 508 of the region of interest 502 and radiation reflected by objects in the side portions 506, 508 may be received by the antennas 412, 414 for object-detection analysis by the LOP controller 406. The region of interest 502 also extends toward the front and the rear of the electric vehicle 112, and these portions of the region of interest 502 may be covered by the antennas 411, 413. The region of interest 502 here extends around the base pad 402 entirely, although other configurations of regions of interest may be used, e.g., where the region of interest extends over less than all the area around the base pad.

Figure 6:
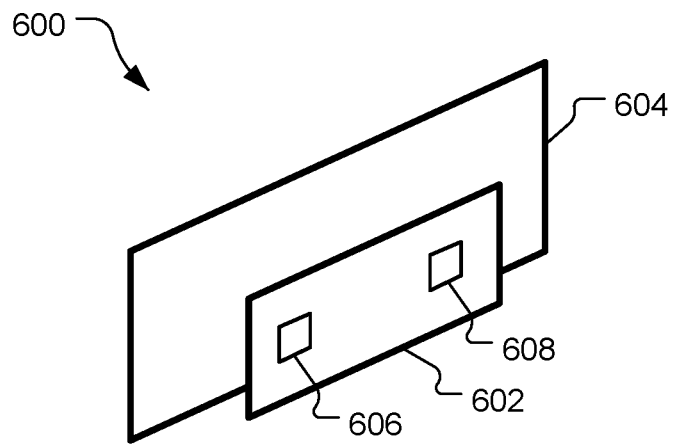
FIG. 6 is a perspective view of an antenna of the base pad shown in FIG. 5.

Referring to FIG. 6, with further reference to FIGS. 4-5, an antenna 600, that is an example of the antennas 411-414, includes a radiator 602 and a reflector 604. The antenna 600 provides RF means for transmitting and receiving RF signals with the RF means including radiating means such as the radiator 602 and reflecting means such as the reflector 604. The radiator 602 includes radiating elements 606, 608. The radiating elements 606, 608 may be any of a variety of radiating elements such as patch radiating elements. The radiating elements 606, 608 are configured to transmit and receive RF signals and may form an array for transmitting and receiving RF signals. Alternatively, one of the radiating elements 606, 608 may be used for transmitting RF signals and the other of the radiating elements 606, 608 may be used for receiving RF signals. As another example, multiple radiating elements may be used for transmitting RF signals and multiple other radiating elements may be used for receiving RF signals (e.g., the radiating element 606 may be an array of radiating elements for transmitting RF signals and the radiating element 608 may be an array of radiating elements for receiving RF signals).

Figure 7:
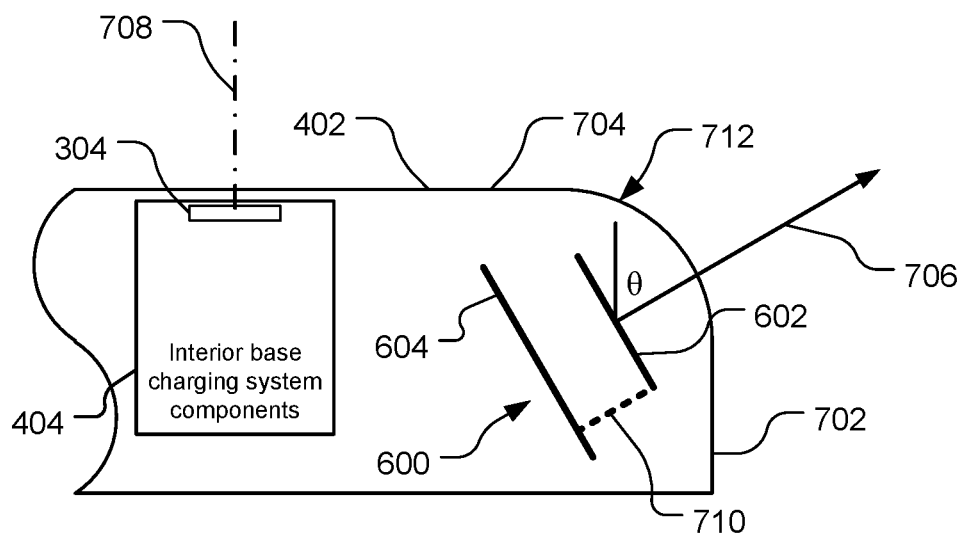
FIG. 7 is a side cut-away view of part of the base pad shown in FIG. 5, showing a side view of the antenna shown in FIG. 6.

Referring also to FIG. 7, the antenna 600 is disposed to send RF signals into the region of interest 502 while inhibiting the antenna 600 from radiating to the interior base charging system components 404. The antenna 600 may be disposed near an edge 702 of the base pad 402 with the reflector 604 disposed between the radiator 602 (and thus the radiating elements 606, 608) and the interior base charging system components 404 (including the power transfer circuitry). The antenna 600 is disposed such that the antenna 600 is tilted toward a top 704 of the base pad 402 to direct a main beam 706 of a signal radiated by the radiator 602 upward to form a corresponding portion of the region of interest 502. The antenna 600 is tilted by an angle θ relative to vertical, with the angle θ chosen to help the radiator 602 provide the main beam 706 to the region of interest 502 and reduce energy loss to the substrate 505. The main beam 706 of the radiator 602 is directed away from the interior of the base pad 402, and thus away from the power transfer circuitry of the interior base charging system components 404. In this example, the power transfer element 304 is a coil centered about an axis 708 and thus the main beam 706 is directed away from the axis 708. A support member 710 physically connects the radiator 602 and the reflector 604 to maintain a desired relationship between the radiator 602 and the reflector 604, e.g., with the reflector 604 being parallel to a plane of the radiator 602 and perpendicular to boresight of the radiator 602. A corner 712 of the base pad 402 is curved although this is not required and other configurations may be used.

The reflector 604 is configured to reflect an RF signal radiated by the radiator 602. Reflecting this RF signal can improve an antenna pattern of the radiator 602, increasing gain of the antenna pattern toward the region of interest 502. Further, reflecting the RF signal from the radiator 602 reduces the amount of RF signal radiated from the radiator 602 transmitted into the interior of the base pad 402. Reducing the RF signal radiated into the interior of the base pad 402 may reduce interference with components within the base pad 402 and/or reduce reflections from within the base pad 402 that are received by the radiator 602. Reducing the reflections from within the base pad 402 that are received by the radiator 602 may reduce false living-object detections and may help maintain sensitivity of the living-object protection subsystem.

The reflector 604 comprises electrically-conductive material, i.e., a conductor, such as metal. The discussion below assumes that the conductor is made of metal for simplicity, but this is not required and the discussion is applicable to non-metal electrically-conductive material. The conductor may have a planar surface, e.g., being made of a sheet of metal (having a thickness much smaller than an area spanned by the conductor), which may be formed in a variety of manners, e.g., by being rolled, or being deposited on a substrate with a planar surface (with the substrate not being considered to be part of the reflector 604), etc. The conductor is preferably non-solid in that the conductor is non-contiguous across an entire span of the reflector 604.

For example, for a rectangular reflector, the conductor will span a length and a width but will not be contiguous over the entire length and width of the area spanned by the conductor. Instead, the conductor will define one or more openings within an area spanned by the conductor. The conductor spans an area enclosed by a perimeter formed by connecting outermost edges of the conductor.

Figure 8:
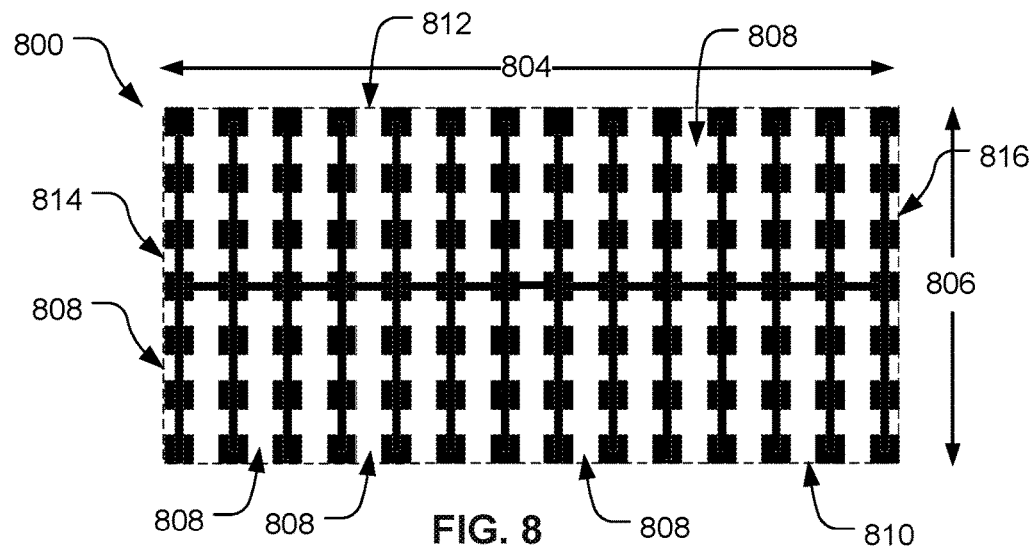
FIGS. 8-10 are front views of example reflectors of the antenna shown in FIG. 6.
Figure 9:
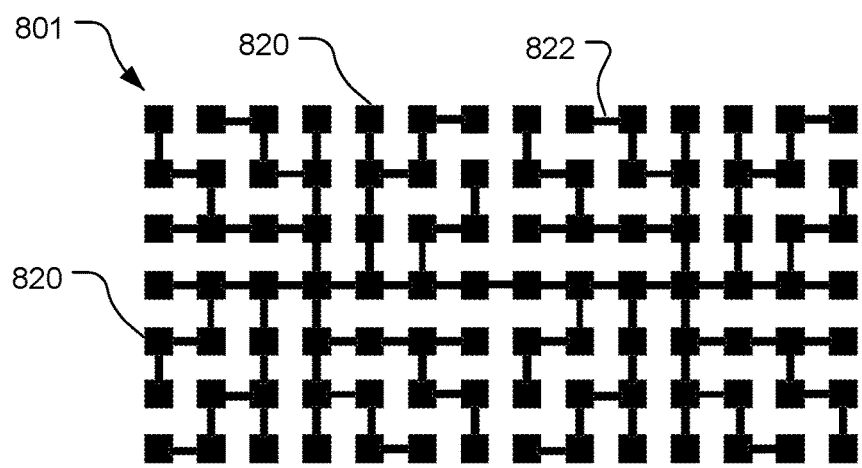
Figure 10:
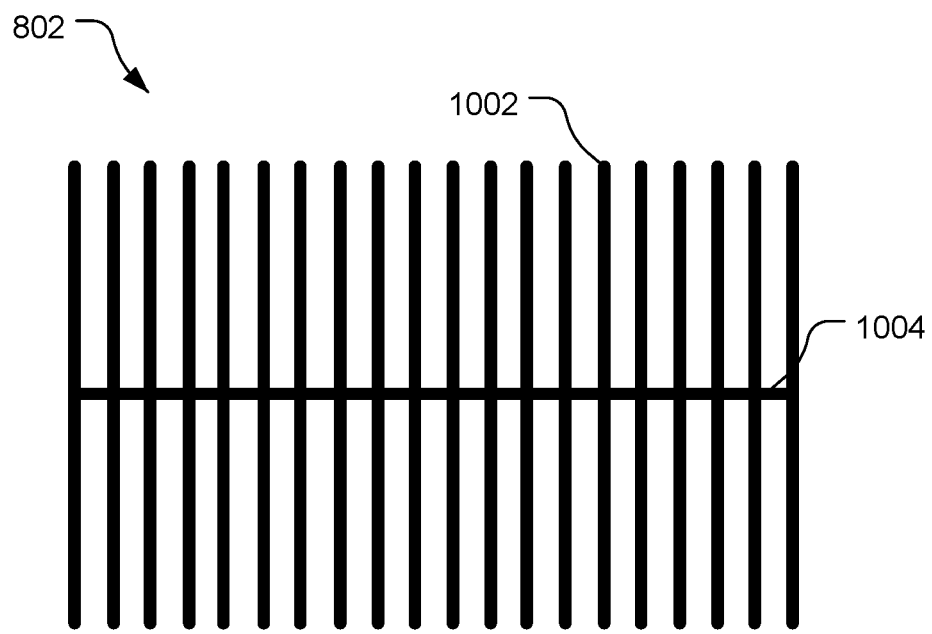

Referring to FIGS. 8-10, with further reference to FIGS. 6-7, examples of conductors 800, 801, 802, respectively, may be used in the reflector 604. The conductors 800-802 are non-contiguous over their lengths and widths, e.g., over a length 804 and a width 806 of the conductor 800, such that the conductors 800-802 are not solid over the entire areas defined by their lengths and widths. The conductors 800-802 are, however, contiguous in that all portions of the conductors 800-802 are electrically coupled with each other, each of the conductors 800-802 being a single piece of metal. This, however, is not required and any of the conductors 800-802 (or another conductor) used as part of the reflector 604 may comprise discrete portions that are not electrically coupled to each other. The conductor comprises sufficient metal that is electrically connected in order to act as a reflector to the signal radiated from the radiator 602 while being sufficiently non-contiguous to inhibit the production of eddy currents.

The conductors 800-802 define openings or voids in the conductors 800-802 to reduce the formation of eddy currents in the conductors 800-802. For example, the conductor 800 defines openings 808 (i.e., portions of an overall area spanned by the conductor 800) each of which extends to a respective edge 810, 812, 814 of the area spanned by the conductor 800. The conductor 800 spans an area enclosed by a perimeter that comprises the edges 810, 812, 814 and an edge 816. Each of the edges 810, 812, 814, 816 is a portion of a perimeter of the area spanned by the conductor 800 and thus includes portions where there is no metal. In the conductor 800, all four of the edges 810, 812, 814, 816 has multiple ones of the openings 808 open to the respective edge 810, 812, 814, 816. The openings 808 are devoid of metal and in fluid communication with a volume immediately outside of the area spanned by the conductor 800. Preferably, the openings 808 of the conductor 800 (and openings of any other conductor) are sized such that none of the openings 808 span a circular region having a diameter of at least a quarter of a wavelength at the frequency of the RF signal radiated by the radiator 602. That is, preferably the conductor 800 (or other conductor) has metal separated by less than a quarter of a wavelength of the RF signal radiated by the radiator 602 at any point within the perimeter of the conductor 800. As shown, none of the openings 808 are laterally enclosed by the conductor 800 such that the conductor 800 forms no loops surrounding any of the openings 808. This helps reduce eddy currents from being formed in the conductor 800 in response to being radiated by charging power from the power transfer element 304 (FIG. 3).

The conductor 801 comprises sub-regions 820 that are electrically coupled to each other by connection sections 822. Here, the sub-regions 820 are squares, are similarly shaped (here, all have the same shape), and are disposed in a two-dimensional grid with consistent spacing between the sub-regions 820. The connection sections 822 are narrower than sub-areas spanned (here occupied) by the sub-regions 820. Here, the connection sections 822 are scripts with a consistent cross-sectional width that is smaller than the length of each of the sides of the sub-regions 820. The conductor 800 also includes a grid of sub-regions, but the sub-regions of the conductor 800 are connected with a different pattern of connection sections than the conductor 801.

The conductor 802 comprises a different pattern of the sub-regions 820, not being a uniform grid of the sub-regions 820 as with the conductors 800-801. Here, each of the sub-regions 820 is connected directly to an adjacent sub-region, without use of connection sections, such that all of the sub-regions 820 of the conductor 802 are electrically connected to each other.

The conductor 802 comprises a fence-like arrangement of metal. The conductor 802 comprises a set of conductive strips 1002 that are parallel to each other and connected to each other by a conductive connecting strip 1004 that is perpendicular to the set of conductive strips 1102.

The conductor's 800-802 shown in FIGS. 8-10 are examples only and numerous other configurations may be used. Conductors spanning shapes of areas other than rectangles may be used, such as circles, ovals, hexagons, irregular shapes, etc. Different patterns of connections joining sub-regions of the conductors may be used. Shapes of conductor sub-regions other than squares may be used. Shapes of sub-regions of a conductor may not be uniform such that a single conductor has sub-regions of different shapes. While it is preferred that the conductor, e.g., any of the conductors 800-802, forms no loops surrounding any openings, a conductor may have one or more loops. If the conductor has one or more loops, the number of loops is preferably small and the size of any loop is preferably small in order to inhibit the formation of eddy currents that require contiguous conductive material to form a loop of current. Inhibiting the production of eddy currents using a non-solid conductor may help reduce heating of the conductor and/or loss of charging power compared to use of a solid reflector conductor. A conductor with one or more contiguous edges and/or one or more large contiguous regions may be used where eddy currents of significant magnitude will not be produced despite one or more of these features, thus potentially providing better RF reflection without significantly heating the conductor or causing significant loss of the charging power.

Figure 11:
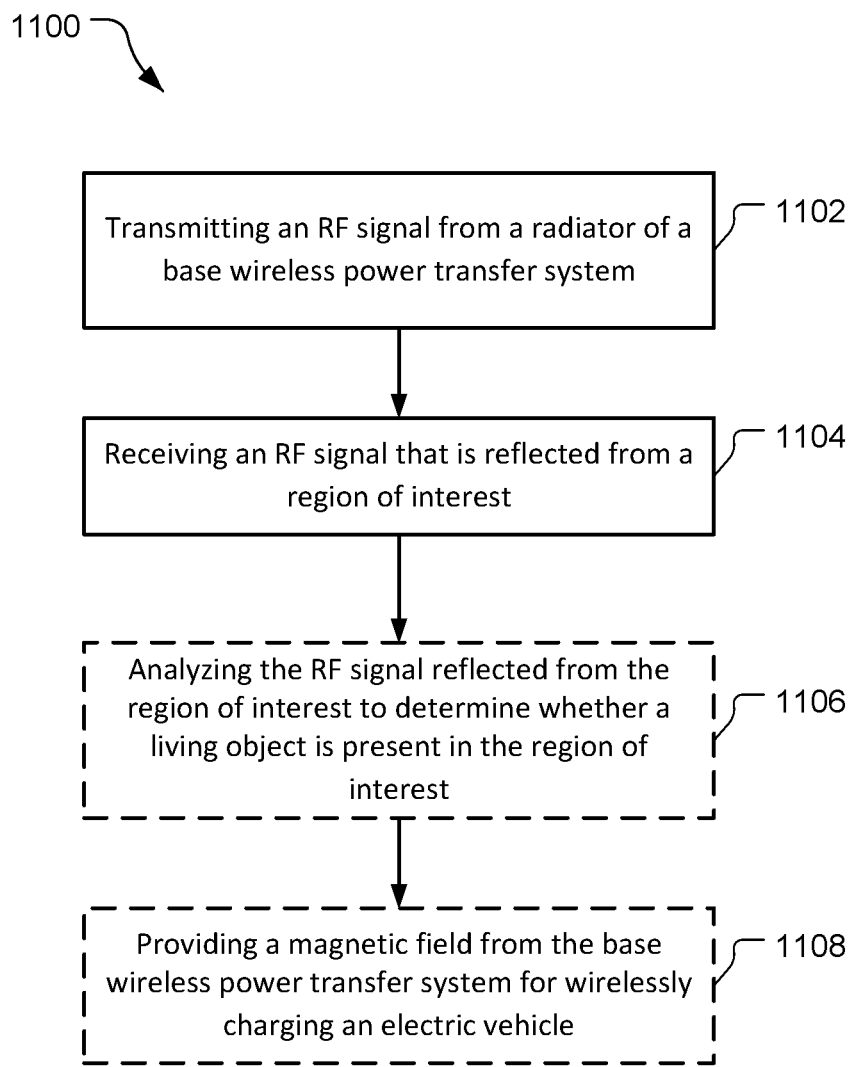
FIG. 11 is a block flow diagram of a method of protecting a living object from wireless electric vehicle charging power.

Referring to FIG. 11, with further reference to FIGS. 1-10, a method 1100 of protecting a living object from wireless electric vehicle charging power includes the stages shown. The method 1100 is, however, an example only and not limiting. The method 1100 may be altered, e.g., by having stages added, removed, rearranged, combined, performed concurrently, and/or having single stages split into multiple stages.

At stage 1102, the method 1100 includes transmitting an RF signal from a radiator of a base wireless power transfer system. The stage 1102 may include transmitting the RF signal from an antenna with the RF signal having a main beam directed away from power-transfer circuitry of the base wireless power transfer system toward a region of interest proximate to the base wireless power transfer system. For example, the radiator 602 of the antenna 600 may transmit an RF signal from the base pad 402 with the main beam 706 directed away from the interior base charging system components 404 toward the region of interest 502. A portion of the RF signal may also be directed at the power-transfer circuitry of the base wireless power transfer system. The stage 1104 includes inhibiting the RF signal from reaching the power-transfer circuitry using a reflector comprising a metal sheet spanning an area. The metal sheet may define at least one opening within the area, at least part of the at least one opening being between the radiator and the power-transfer circuitry, and the at least one opening extending to an edge of the area. For example, the reflector 604 may reflect at least part of the signal radiated by the radiator 602 toward the interior base charging system components 404 back toward the region of interest 502, with the reflector 604 being a non-solid sheet of metal, with one or more openings, e.g., the openings 808, extending to an edge of an area spanned by the reflector. The inhibiting may comprise inhibiting eddy current formation in the metal sheet by inhibiting current induced in the metal sheet from forming a loop enclosing an opening in the metal sheet. A portion of the RF signal that reaches a region of interest proximate to the base wireless power transfer system, e.g., the region of interest 502, is a first RF signal.

At stage 1104, the method 1100 includes receiving an RF signal that is reflected from the region of interest. For example, an object in the region of interest 502 may reflect part of the first RF signal, as a reflected signal, back toward the radiator 602 and the radiator 602 may receive the reflected RF signal (which may be called a second RF signal) and provide the reflected RF signal to the LOP controller 406.

At stage 1106, the method 1100 includes analyzing the RF signal reflected from the region of interest (i.e., the second RF signal) to determine whether a living object is present in the region of interest. For example, the LOP controller 406 may analyze the second RF signal to determine whether an amplitude of the reflected signal is above a threshold magnitude and that the magnitude of the reflected signal changes over time indicating movement of the object and thus that the object is likely a living object. Other known techniques may be used to analyze the reflected signal to determine whether a living object is, or likely is, in the region of interest 502 and thus that it is undesirable to provide charging power from the components 404 to avoid harming the living object.

At stage 1108, the method 1100 includes providing a magnetic field from the base wireless power transfer system for wirelessly charging an electric vehicle. The stage 1108 may include providing the charging power in response to determining that no living object is present in the region of interest. The stage 1108 may include the LOP controller 406 providing a no-living-object indication to the components 404 indicating that no living object is present in the region of interest 502. The components 404 may respond to the no-living-object indication by providing charging power to the electric vehicle 112 by providing charging power to the base power transfer element 304 to produce a magnetic field with sufficient energy to charge the electric vehicle 112. The components 404 may be inhibited or prevented from providing, or continuing to provide, the charging power in the absence of receiving the no-living-object indication from the LOP controller 406. Thus, even if the components 404 receive the no-living-object indication and begin providing charging power, if the components 404 cease to receive the no-living-object indication (e.g., continuously, at an expected time such as a periodic interval, etc.), then the components 404 may cease to provide the charging power.

Other Considerations

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

The term "exemplary" indicates that something is an example and does not imply that the thing (e.g., a feature or embodiment) is better than or preferred over another thing. Thus, an "exemplary embodiment" may not be the best known embodiment, and may not be preferred over another embodiment, but the exemplary embodiment is an example of an embodiment that may be used.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

Substantial variations may be made in accordance with specific requirements. For example, customized hardware might also be used. Further, connection to other computing devices such as network input/output devices may be employed.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure.

Components, functional or otherwise, shown in the figures and/or discussed herein as being coupled (e.g., communicatively coupled), connected, or communicating with each other are operably coupled. That is, they may be directly or indirectly, wired or wirelessly, connected to enable signal flow between them.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

Further, more than one invention may be disclosed.

The invention claimed is:

1. A base wireless power transfer system comprising:
a power-coupling element;
power transfer circuitry communicatively coupled to the power-coupling element and configured to provide energy to the power-coupling element to produce a magnetic field; and
a living-object protection subsystem comprising:
an antenna configured to transmit a first radio-frequency (RF) signal with a main beam directed away from the power transfer circuitry and to receive a second RF signal, the antenna comprising a radiating element and a reflector with the reflector being disposed between the radiating element and the power transfer circuitry and comprising a metal sheet disposed over an area, the metal sheet defining at least one opening within the area and between the radiating element and the power transfer circuitry; and
a processor communicatively coupled to the antenna and configured to analyze the second RF signal received by the antenna to determine whether an object is present in a region of interest proximate to the base wireless power transfer system.

2. The system of claim 1, wherein the reflector defines a plurality of openings, within the area, that are each open to a respective edge of the area.

3. The system of claim 2, wherein at least one edge of the area is continuous, having none of the plurality of openings being open to the at least one edge.

4. The system of claim 2, wherein the area is rectangular such that the reflector has four edges, and wherein every edge of the reflector has at least one opening of the plurality of openings open to the respective edge.

5. The system of claim 1, wherein the reflector defines a plurality of openings, within the area, without laterally enclosing, by metal, any of the plurality of openings.

6. The system of claim 1, wherein the reflector comprises a plurality of sub-regions and a plurality of connection sections, each of the plurality of sub-regions spanning at least a sub-area, the plurality of sub-regions being connected by the plurality of connection sections, wherein each of the plurality of connection sections is narrower than the each of the plurality of sub-regions.

7. The system of claim 6, wherein the plurality of sub-regions and the plurality of connection sections form no loops.

8. The system of claim 6, wherein the sub-regions are similarly shaped.

9. The system of claim 8, wherein the plurality of sub-regions are disposed in a grid.

10. The system of claim 1, wherein the antenna comprises discrete radiating elements for transmitting the first RF signal and for receiving the second RF signal.

11. The system of claim 1, further comprising a housing containing the power-coupling element, the power transfer circuitry, and the living-object protection subsystem, the power-coupling element being a coil centered about an axis, and the antenna being disposed to transmit the main beam of the first RF signal away from the axis and toward the region of interest.

12. The system of claim 1, wherein the at least one opening extends to an edge of the area.

13. A base wireless power transfer system comprising:
coupling means for producing a magnetic field;
power transfer means, communicatively coupled to the coupling means, for providing energy to the coupling means to produce the magnetic field; and
living-object protection means comprising:
radio-frequency (RF) means for transmitting a first RF signal with a main beam directed away from the power transfer means and for receiving a second RF signal, the RF means including radiating means and reflecting means with the reflecting means being disposed between the radiating means and the power transfer means and comprising a metal sheet disposed over an area, the metal sheet defining at least one opening within the area, at least part of the at least one opening being between the radiating means and the power transfer means, and the at least one opening extending to an edge of the area; and
analyzing means communicatively coupled to the RF means for analyzing the second RF signal to determine whether an object is present in a region of interest proximate to the base wireless power transfer system.

14. The system of claim 13, wherein the reflecting means define a plurality of openings, within the area, that are each open to a respective edge of the area.

15. The system of claim 14, wherein at least one edge of the area is continuous, having none of the plurality of openings being open to the at least one edge.

16. The system of claim 14, wherein the area is rectangular such that the reflecting means have four edges, and wherein every edge of the reflecting means has at least one opening of the plurality of openings open to the respective edge.

17. The system of claim 13, wherein the reflecting means define a plurality of openings, within the area, without laterally enclosing, by metal, any of the plurality of openings.

18. The system of claim 13, wherein the reflecting means comprise a plurality of sub-regions and a plurality of connection sections, each of the plurality of sub-regions spanning at least a sub-area, the plurality of sub-regions being connected by the plurality of connection sections, wherein each of the plurality of connection sections is narrower than the each of the plurality of sub-regions.

19. The system of claim 18, wherein the plurality of sub-regions and the plurality of connection sections form no loops.

20. The system of claim 18, wherein the sub-regions are similarly shaped.

21. The system of claim 20, wherein the plurality of sub-regions are disposed in a grid.

22. The system of claim 13, wherein the RF means comprise discrete radiating elements for transmitting the first RF signal and for receiving the second RF signal.

23. The system of claim 13, further comprising housing means for containing the coupling means, the power transfer means, and the living-object protection means, the coupling means comprising a coil centered about an axis, and the RF means being disposed to transmit the main beam of the first RF signal away from the axis and toward the region of interest.

24. A method of protecting a living object from wireless electric vehicle charging power, the method comprising:
transmitting a radio-frequency (RF) signal from a radiator of a base wireless power transfer system, a portion of the RF signal that reaches a region of interest proximate to the base wireless power transfer system being a first RF signal, the transmitting including inhibiting the RF signal from reaching the power-transfer circuitry using a reflector comprising a metal sheet spanning an area, the metal sheet defining at least one opening within the area, at least part of the at least one opening being between the radiator and the power-transfer circuitry, and the at least one opening extending to an edge of the area;
receiving a second RF signal that is a reflection of at least part of the first RF signal from the region of interest;
analyzing the second RF signal to determine whether a living object is present in the region of interest; and
providing, in response to determining that no living object is present in the region of interest, a magnetic field from the base wireless power transfer system for wirelessly charging an electric vehicle.

25. The method of claim 24, wherein the inhibiting comprises inhibiting eddy current formation in the metal sheet by inhibiting current induced in the metal sheet from forming a loop enclosing any of the at least one opening in the metal sheet.

* * * * *